United States Patent [19]

Stöffler et al.

[11] Patent Number: 4,771,925
[45] Date of Patent: Sep. 20, 1988

[54] FLAP VALVE FOR A DISPENSER

[75] Inventors: Albert Stöffler, Düsseldorf/Benrath; Dietholf Mehl, Düsseldorf; Lorenz Eckers, Mönchengladbach, all of Fed. Rep. of Germany

[73] Assignee: Henkel Kommanditgesellschaft auf Aktien, Duesseldorf, Fed. Rep. of Germany

[21] Appl. No.: 554,091

[22] Filed: Nov. 21, 1983

Related U.S. Application Data

[63] Continuation of Ser. No. 226,147, Jan. 19, 1981, abandoned.

[30] Foreign Application Priority Data

Sep. 22, 1980 [DE] Fed. Rep. of Germany ....... 3035742

[51] Int. Cl.⁴ ............................................. B65D 25/08
[52] U.S. Cl. .................................... 222/207; 222/383; 137/855
[58] Field of Search ................. 137/454.2, 527.8, 855, 137/856; 222/207, 209, 383, 494

[56] References Cited

U.S. PATENT DOCUMENTS

| | | | |
|---|---|---|---|
| 1,925,926 | 9/1933 | Kunkel | 222/494 |
| 3,361,305 | 1/1968 | Spatz | 222/207 |
| 3,613,720 | 10/1971 | Welch | |
| 3,626,148 | 12/1971 | Waytowich et al. | 137/527.8 X |
| 3,814,124 | 6/1974 | Bell | 137/454.2 X |
| 3,955,901 | 5/1976 | Hamilton | 137/855 X |
| 4,149,633 | 4/1979 | Nilson | 222/207 X |
| 4,154,371 | 5/1979 | Kolaczinski | 222/494 X |

FOREIGN PATENT DOCUMENTS

| | | | |
|---|---|---|---|
| 194201 | 10/1905 | Fed. Rep. of Germany . | |
| 2901717 | 7/1980 | Fed. Rep. of Germany | 222/383 |
| 370421 | 2/1907 | France . | |
| 672884 | 5/1952 | United Kingdom | 137/855 |

Primary Examiner—James B. Marbert
Attorney, Agent, or Firm—Ernest G. Szoke; Henry E. Millson, Jr.; William H. Dippert

[57] ABSTRACT

This invention is directed to a flap valve for a dispenser for viscous fluids. More particularly, this invention is directed to a flap valve having a body with a cylindrical valve opening therein, produced by injection molding which is circularly symmetrical to the cylindrical valve opening and extends outwardly around the axis of symmetry, wherein at least one spoke bridges the valve opening diametrically and has a sprue wart in the center thereof, said body cooperating with a flap which closes said cylindrical valve opening, the center part of which flap is arched away from the sprue wart out of the plane of its edge, which edge sealingly fits over the edge of said cylindrical valve opening.

2 Claims, 2 Drawing Sheets

FLAP VALVE FOR A DISPENSER

This application is a continuation of co-pending U.S. patent application Ser. No. 226,147, filed Jan. 19, 1981, now abandoned.

FIELD OF THE INVENTION

This invention is directed to a flap valve for a dispenser for viscous fluids. More particularly, thisi nvention is directed to a dispenser having a novel flap valve means which can be injection molded.

BACKGROUND OF THE INVENTION

Membrane pumps where the body consists of eleastic material and forms part of the space to be compressed, are advantageously used in dispensers for viscous products, such as toothpaste, lotions, or the like. Such a dispenser may consist of a cylindrical container with covering face and a piston which sealingly fits against the inside wall of the container at its circumference and pressed the viscous container filling against the covering face during forward movement caused by the atmospheric pressure. The membrane pump may consist of an inlet valve in the covering face, an outlet valve, and a pump chamber remaining between the valves which is to be elastically compressed and which is closed except for the valves.

Dispenser containers for viscous fluids are well known. For example, a dispenser for viscous cosmetics such as toothpaste or lotion is described in Kolaczinski et al. U.S. Pat. No. 4,154,371. The Kolaczinski et al. container comprises a piston forming the bottom of the container and being displaceable in the container; a compressible container part, lying in front of the piston; a mouthpiece, for withdrawal of the contents, of flexible and elastic material; and a delivery valve opening on excess pressure in the container. The piston is secured by a blocking pawl against any displacement causing enlargement of the interior space of the container. The delivery valve comprises a flap having an ares of 0.8 cm$^2$ or less which is mounted in the mouthpiece by resilient hinge means.

A similarly useful dispenser is also described in Spatz, U.S. Pat. No. 3,361,305. In the Spatz dispenser, several inlet flap valves are arranged in the top surface of the container between the storage chamber of the container and the pump chamber, which flap valves are arranged substantially symmetrically to the center of the top surface. When the diaphragm pump of the dispenser is operated, a flexible, elastic surface is moved downward, perpendicularly to the top surface containing the flap valves in such a way that the product contained in the pump chamber is ejected or dipensed through the delivery or outlet valve of the despenser. When the flexible, elastic surface returns to its normal, unstressed position, the delivery valve is closed because of a resulting vacuum and the inlet flap valves arranged in the top surface open in such a way that new material is drawn into the pump chamber from the interior of the container, that is, from the storage chamber, by the pressure differential, or vacuum, produced in the pump chamber.

In useful dispenser containers, the ciruclar, symmetrical elastic body or portion of a body containing the valve opening of the outlet flap valve may, of course, be produced in different ways, such as, for example, by extruding a material which, after extrusion, an be elastically shaped in the desired degree. However, when products are extruded in quantity, slight deviations from the specified dimensions are inevitable. Thus, an extruded body surrounding the outlet valve opening in circularly symmetrical fashion, for example, like a bell, is likely to lack homogeneity and can therefore not fulfill close tolerances exactly. In therory, plastic parts can be produced by automated injection molded with high precision and also with considerable homogeneity with regard to the internal stresses. For circularly symmetrical bodies, however, this is true only if the injection molding is effected from a point of the axis of symmetry.

Since the body of the above-mentioned flap valve adjacent to the circularly symmetrical valve opening is everywhere farther away from the axis of symmetry than the inner circumference of the valve opening itself, the sprue in injection molding can actually start only in the area of the valve itself. The only part of the flap valve which touches the axis of symmetry is its flap. But injection molding cannot proceed from the flap, as that structural part is itself normally unsymmetrical because it is to be connected with the rest of the valve body on one side only, for instance, through a film hinge. If, therefore, the sprue must be placed at a point along the line of symmetry of the body, this point can logically lie only in the area of the narrowest circumference of the body, that is, in the valve opening. Since in injection molding there always remains a more or less large sprue wart, reliable operation of the flap valve cannot be readily assumed—even if the remaining residual aperture cross-section is sufficiently large— because the flap will not always seal to the required degree, for example, if the sprue wart is relatively thick. The result has heretofore been that this possible disadvantage could be remedied only by grinding down or complete removal of the sprue in a special production step after the molding.

OBJECTS OF THE INVENTION

It is an object of the invention to provide an improved dispenser for the discharge of quantities of viscous fluid.

It is also an object of the invention to provide a dispenser having an improved outlet flap valve.

It is a further object of the invention to provide a dispenser having a flap valve such that the dispenser and flap valve can be produced by injection molding with a surrounding, homogenerously stressed body which meets specified dimensions without the requirement of special machining of the sprue.

It is a yet further object of the invention to provide a flap valve produced by injection molding which is circularly symmetrical to the cylindrical valve opening and extends outwardly around the axis of the symmetry, wherein a spoke bridges the valve opening diametrically and has a sprue wart in the center thereof and the valve has a flap which closes the valve, the center part of which flap is arched away from the sprue wart out of the plane of its edge, which edge can be sealingly fitted over one edge of the valve opening.

These and other objects of the invention will become more apparent in the discussion below.

DETAILED DESCRIPTION OF THE INVENTION

The invention is directed to providing a dispenser for viscous fluids having a suitable outlet flap valve means. According to the invention, a spoke bridges the cylindrical valve opening diametrically and has a sprue wart lying in the center thereof, and a valve flap whose central portion is arched, in particular, spherically arched, away from the sprue wart out of the plane of its edge, is sealingly fitted to the edge of the opening.

The valve opening can be bridged without any interference with the operation of the flap valve, by a spoke, from the center of which, lying on the axis of symmetry, the injection molding of the entire body can be carried out to provide desired stress homogeneity and trueness to form. The spoke can be dimensioned so that it has only a relatively small effect on the aperture cross-section. If desired, the aperture may be made somewhat larger, as a whole, than other flap valves not "bridged", so that the overall flow to be taken up by the valve is not adversely affected. In any case, no remachining is necessary for the valve is ensured also if the sprue wart is relatively large. The arch of the valve flap according to the invention, in fact, ensures that there is always a sufficient distance from the sprue wart, so that the edge of the flap valve is sure to lie smoothly on the edge of the valve opening.

Since because of its unilateral attachment the flap valve itself is necessaryily unsymmetrically in relation to said aixs of symmetry of the valve opening with contigurous body, simultaneous production of the valve flap with the injection molding of the valve opening and body would lead to inhomogeneities with respect to material distribution and internal stresses of the molded part. The associated problems are overcome according to a further aspect of the invention in that the body containing the valve opening and the valve flap, with appropriate mount if desired, are structural parts produced separately. In automated production of the flap valve of the invention and the structural parts coupled therewith, for example, a membrane pump, separate parts can be assembled, particularly if they are matched as to form, much more easily than remachining of separate parts could be done. The manufacture of the flap valve of the invention is thus relatively simple in an automated operation if the valve opening with contigurous body and the valve flap are produced separately and then assembled.

Figure 1:
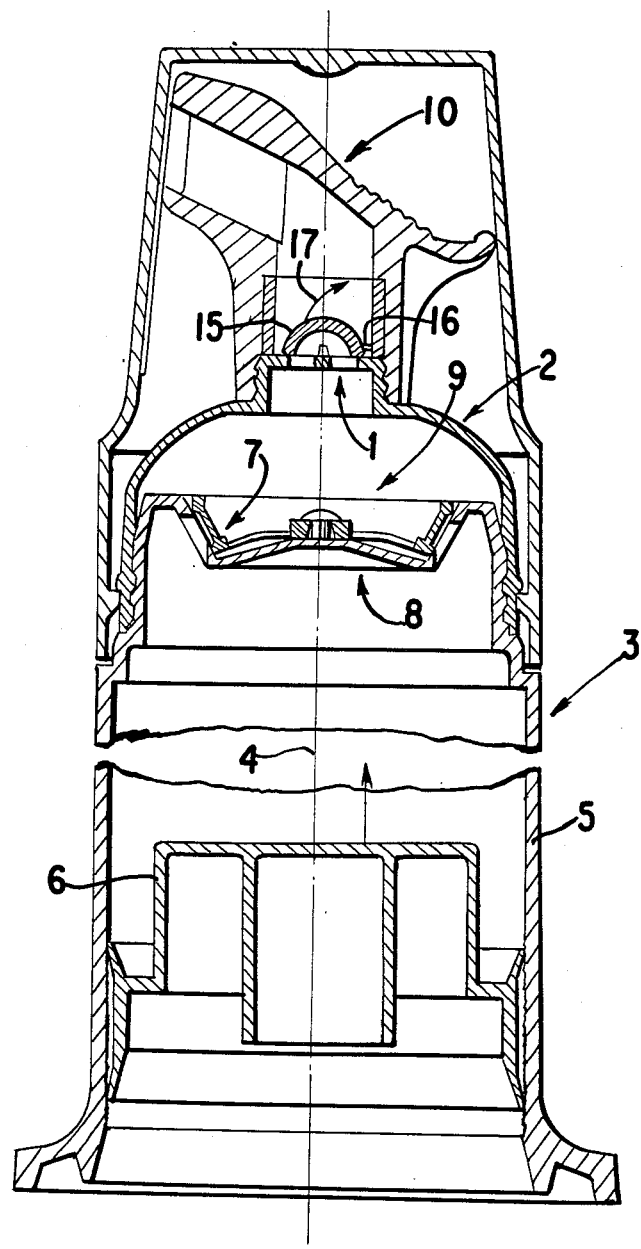
FIG. 1 represents a longitudinal cross-sectional view of a dispenser container according to the invention.

Other details of the invention will be described and can be appreciated better by making reference to the embodiment of the invention set forth in FIGS. 1 and 2. FIG. 1 shows a flap valve according to the invention, marked 1 as a whole, integrated into a membrane pump, marked 2 as a whole, of a dispenser marked 3. Flap valve 1, membrane pump 2, and dispenser 3 are all substantially circularly symmetrical in relation to the longitudinal axis 4. The dispenser 3 consists of a cylindrical container 5 with piston 6 sealingly sliding therein and with an integrated covering face 8 which contains the inlet valve 7 of the membrane pump 2. The flap valve 1 is opposite the covering face 8 with regard to the pump chamber 9, and a mouthpiece 10 for delivering viscous product, such as toothpaste, forms a part of container 5.

Figure 2:
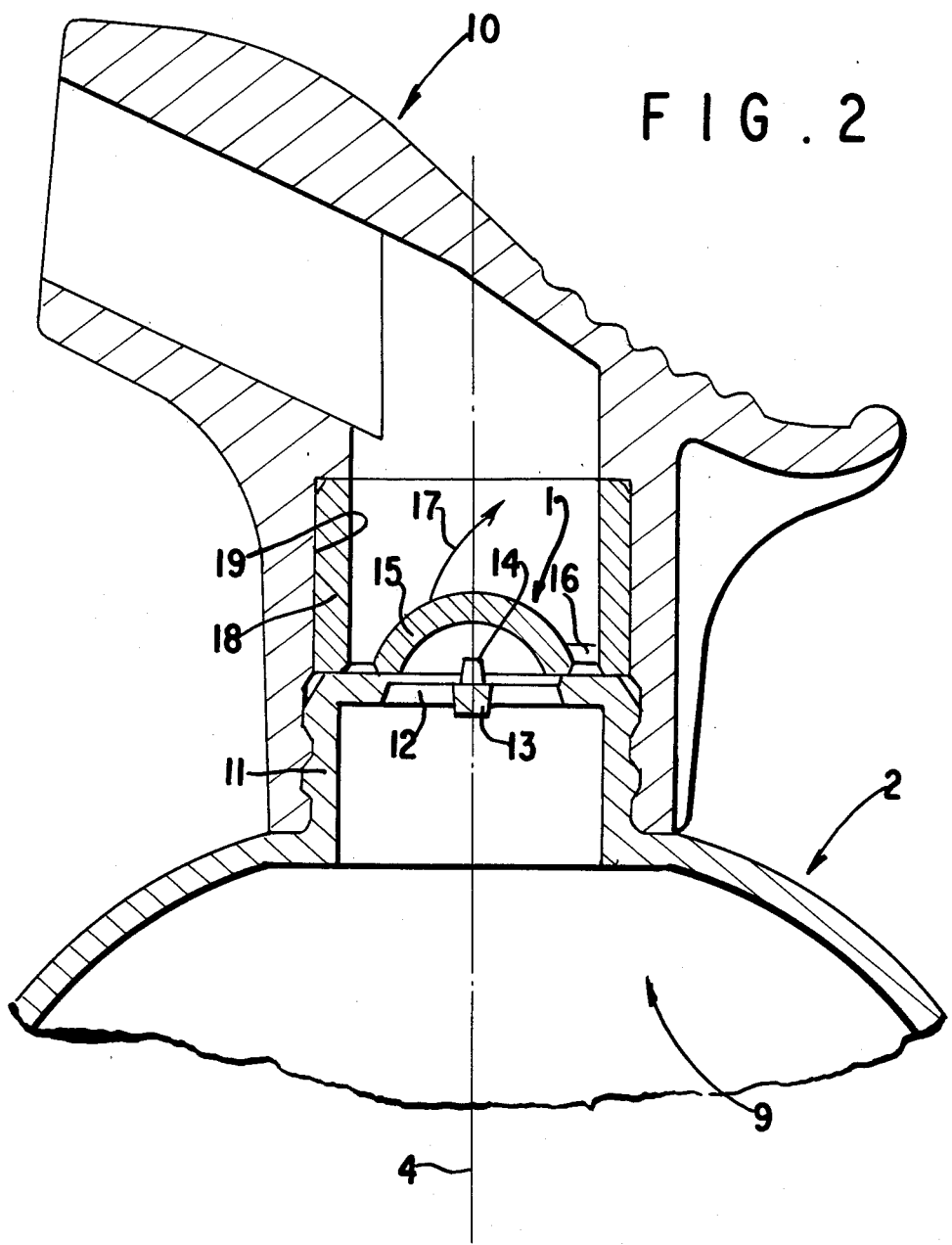
FIG. 2 represents an enlarged, longitudinal cross-sectional view of an outlet valve means according to the invention.

The flap valve 1, indicated in FIG. 1 only as part of an overall device, is shown schematically on a larger scale and in greater detail in FIG. 2. Flap valve 1 is contained in the embodiment in a neck 11 of the membrane pump 2 placed on the pump chamber 9 symmetrically to the longitudinal axis 4. At the upper end and toward the mouthpiece 10, the neck 11 has valve opening 12, which is curcular because of the desired circular symmetry. Diametrically through the valve opening 12 there extends, however, a spoke 13 shown in section, whose function is to serve as sprue for the injection molding of the entire body of the flap valve 1 or of the membrane pump 2, which body is directly connected with the valve opening 12.

It is, as a rule, inevitable that a wart remains at a sprue. Such a wart 14 remaining on spoke 13 would impair the satisfactory closing of a normally flat valve flap lying on top of the valve opening 12, as shown in FIG. 2. Therefore, according to the invention, an arched, particularly spherically arched, valve flap 15 is provided, which can be pivoted about a film hinge 16 in the direction of arrow 17. Regardless of the size of the wart 14, a smooth, sealing application of the valve flap edge on the entire circumference of the valve opening 12 is always ensured becasue of the arch of the valve flap 15.

Since due to the unilateral hinge 16 the valve flap can be nature by produced only asymmetrically in relation to the longitudinal axis 4, the simultaneous injection molding of the valve flap 15 with the other parts of the valve could possible harm the desired homogeneity of stress and form. According to the further aspect of the invention, therefore, the valve flap 15 is produced separately, for example, together with a separate suppporting cylinder 18, with which it is connected through the hinge 16. Preferably the supporting cylinder 18 is designed so that it can be inserted into a corresponding recess 19 of a contiguous body, for example, the mouthepiece 10, with ease, such as in automated operation, and thus can be correlated by a respective automatic machine to the valve opening 12 during assembly or packaging in the prescribed manner without problem.

Aspects of the operation of the dispenser described herein are more fully described in commonly assigned, concurrently filed U.S. patent application Ser. No. 226,149, filed Jan. 19, 1981 for "Dispenser container for Viscous Fluids", now U.S. Pat. No. 4,394,939, incorporated herein by reference. Also, the operation and structure of piston 6 and mouthpiece 10 is more fully described in commonly assigned, concurrently filed U.S. patent application Ser. No. 226,148, filed Jan. 19, 1981, for "Dispenser Container" now, U.S. Pat. No. 4,402,431, incorporated herein by reference.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A flap valve assembly functioning as a component of a membrane pump for dispensing viscous fluids which comprises (1) a body produced by injection molding and having a cylindrical valve opening therein and (2) a co-operating flap means comprising a flap which closes said cylindrcal opening and a cylindrcal member surrounding said flap, wherein said body is concentric to said cylindrical valve opening and extends outwardly around the axis of symmetry, said body having at least one spoke bridging said cylindrical valve opening diametrically and having a sprue wart in the center of said spoke; said flap is concave with respect of the surface of said flap means adjacent to said body and the edge of said flap sealingly fits over said cylindrical valve opening; and said cylindrical member and said flap are arranged in such a manner that they can be force-fitted into a sleeve.

2. A dispenser container for dispensing viscous fluids comprising a container body provided with a resiliently compresible portion including a mouthpiece at one end of said container body, said mouthpiece having a sleeve therein; a storage chamber to hold material to be dispensed; a piston member arranged in said container body at the other end contacting the inner wall of the container to define a boundary of the storage chamber, the piston member bing movable towards and restrained form movement away from said compressible portion; a top surface to the storage chamber; and an elastically compressible membrane pump having an inlet valve in the top surface, an outlet valve in the upper surface of the membrane pump, and a pump chamber between the valves, the outlet valve being a flap assembly which comprises (1) a body produced by injection molding and having a cylindrical valve opening therein and (2) a co-operating flap means comprising a flap which closes said cylindrical opening and a cylindrical member surrounding said flap, wherein said body is concentric to said cylindrical valve opening and extends outwardly around the axis of symmetry, said body having at least one spoke bridging said cylindrical valve opening diametriclly and having a sprue wart in the center of said spoke; said flap is concave with respect to the surface of said flap means adjacent to said body and the edge of said flap sealingly fits over said cylindrical valve opening; and said cylindrical member and said flap are arranged in such a manner that they can be force-fitted into said sleeve.

* * * * *